United States Patent
Bao et al.

(10) Patent No.: US 10,796,179 B2
(45) Date of Patent: Oct. 6, 2020

(54) LIVING FACE VERIFICATION METHOD AND DEVICE

(71) Applicant: Tencent Technology (Shenzhen) Company Limited, Shenzhen (CN)

(72) Inventors: Guanbo Bao, Shenzhen (CN); Jilin Li, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 89 days.

(21) Appl. No.: 16/024,117

(22) Filed: Jun. 29, 2018

(65) Prior Publication Data
US 2018/0307928 A1    Oct. 25, 2018

Related U.S. Application Data (63) Continuation-in-part of application No. PCT/CN2017/080376, filed on Apr. 13, 2017.

(30) Foreign Application Priority Data

Apr. 21, 2016 (CN) .......................... 2016 1 0252267

(51) Int. Cl.
 *G06K 9/00* (2006.01)
 *G06K 9/62* (2006.01)
(52) U.S. Cl.
 CPC ..... *G06K 9/00906* (2013.01); *G06K 9/00261* (2013.01); *G06K 9/00268* (2013.01); *G06K 9/00288* (2013.01); *G06K 9/6211* (2013.01)
(58) Field of Classification Search
 None
 See application file for complete search history.

(56) References Cited

U.S. PATENT DOCUMENTS

| 2008/0192980 A1 | 8/2008 | Park et al. |
| 2010/0059589 A1* | 3/2010 | Goncalves ......... G06K 9/00771 235/383 |

(Continued)

FOREIGN PATENT DOCUMENTS

| CN | 101923641 A | 12/2010 |
| CN | 102065313 A | 5/2011 |

(Continued)

OTHER PUBLICATIONS

Khan, Sohaib & Javed, Omar & Shah, Mubarak. (2001). Tracking in Uncalibrated Cameras with Overlapping Field of View. (Year: 2001).*

(Continued)

*Primary Examiner* — Hadi Akhavannik
(74) *Attorney, Agent, or Firm* — Morgan, Lewis & Bockius LLP (57) ABSTRACT

The present application discloses a live human face verification method and device. The device acquires face images captured by at least two cameras and performs feature point registration on the face images according to preset face feature points, to obtain corresponding feature point combinations between the face images. After fitting out a homography transformation matrix among the feature point combinations, the device calculates transformation errors of the feature point combinations using the homography transformation matrix to obtain an error calculation result, and performing live human face verification of the face images according to the error calculation result. The embodiments of the present application do not need to calibrate the cameras, so the amount of calculation of a living body judgment algorithm can be reduced; moreover, the cameras can be freely placed, and thereby the flexibility and convenience of living body judgment can be increased.

17 Claims, 6 Drawing Sheets

(56) References Cited

U.S. PATENT DOCUMENTS

| | | | |
|---|---|---|---|
| 2011/0150275 A1* | 6/2011 | Tong | G06T 3/0068 |
| | | | 382/103 |
| 2011/0254942 A1* | 10/2011 | Suzuki | G06K 9/00221 |
| | | | 348/77 |
| 2011/0299741 A1* | 12/2011 | Zhang | G06K 9/00906 |
| | | | 382/117 |
| 2012/0301011 A1* | 11/2012 | Grzechnik | G06T 19/006 |
| | | | 382/154 |
| 2016/0035097 A1* | 2/2016 | Zhou | G06F 3/017 |
| | | | 235/375 |

FOREIGN PATENT DOCUMENTS

| | | |
|---|---|---|
| CN | 103679118 A | 3/2014 |
| CN | 104573682 A | 4/2015 |
| CN | 105023010 A | 11/2015 |
| CN | 105205458 A | 12/2015 |
| CN | 105868733 A | 8/2016 |
| JP | WO 2009004916 A1 | 8/2010 |
| JP | WO 2010050206 A1 | 3/2012 |

OTHER PUBLICATIONS

Tencent Technology, ISRWO, PCT/CN2017/080376, dated Jun. 21, 2017, 8 pgs.

Tencent Technology, IPRP, PCT/CN2017/080376, dated Oct. 23, 2018, 6 pgs.

* cited by examiner

LIVING FACE VERIFICATION METHOD AND DEVICE

PRIORITY CLAIM AND RELATED APPLICATION

This application is a continuation-in-part application of PCT/CN2017/080376, entitled "FACIAL IN-VIVO VERIFICATION METHOD AND DEVICE" filed on Apr. 13, 2017, which claims priority to Chinese Patent Application No. 201610252267.9, filed with the State Intellectual Property Office of the People's Republic of China on Apr. 21, 2016, and entitled "LIVING FACE VERIFICATION METHOD AND DEVICE", all of which are incorporated herein by reference in their entirety.

FIELD OF THE TECHNOLOGY

The present application belongs to the technical field of face recognition, and particularly relates to a live human face verification method and device.

BACKGROUND OF THE DISCLOSURE

With the development of biological recognition technology, the face recognition technology has been tending to be mature. For some face recognition systems, such as an access control system and a login system, users can cheat the systems by illegal means, such as pictures. Therefore, living body detection has become a measure for guaranteeing the safety of such systems. Living body detection means a technology which judges whether an inputted face is a plane false body or a real live human face.

The existing multi-camera living body detection technology normally adopts horizontally arranged left and right binocular cameras. After binocular calibration is conducted, stereo matching of a left image and a right image is conducted, so that depth information of a face region is recovered, and according to the regular depth information of the face region, the face of a real person and a plane false body (such as a picture or a video played on a mobile device (such as a mobile phone or a tablet computer) or a piece of printed face paper) are distinguished.

SUMMARY

In order to solve the above-mentioned technical problem, the embodiments of the present application provide the following technical solution:

According to a first aspect of the present application, disclosed is a live human face verification method performed at a computing device having one or more processors and memory storing a plurality of programs to be executed by the one or more processors, the method comprising:

acquiring face images captured by at least two cameras;

performing feature point registration on the face images according to preset face feature points, to obtain corresponding feature point combinations between the face images;

utilizing preset algorithms to fit out a homography transformation matrix among the feature point combinations;

calculating transformation errors of the feature point combinations using the homography transformation matrix to obtain an error calculation result; and performing live human face verification of the face images according to the error calculation result.

According to a second aspect of the present application, disclosed is a computing device comprising one or more processors, memory coupled to the one or more processors, and a plurality of programs stored in the memory that, when executed by the one or more processors, cause the mobile terminal to perform the aforementioned live human face verification method.

According to a third aspect of the present application, disclosed is a non-transitory computer readable storage medium stores a plurality of programs that, when executed by one or more processors of a computing device, cause the computing device to perform the aforementioned live human face verification method.

Compared with the existing technology, the embodiments of the present application do not need to calibrate the cameras, so calibration errors in the process of camera calibration in the existing technology are eliminated. The method of the embodiments of the present application directly carries out feature point matching on captured face images, fits out a homography transformation matrix and, after obtaining an error calculation result using the homography transformation matrix, carries out live human face verification, and therefore, compared with the existing living body detection technology, the method greatly reduces the amount of calculation of a living body judgment algorithm and increases the speed and real-time performance of living body detection.

BRIEF DESCRIPTION OF THE DRAWINGS

In reference to the drawings, the specific embodiments of the present application will be described in detail below, so that the technical solution and other beneficial effects of the present application can become obvious.

DESCRIPTION OF EMBODIMENTS

Referring to the drawings, wherein the same component symbols represent the same components. The principle of the present application is illustrated by being implemented in an appropriate computing environment. What is illustrated below is based on the exemplary specific embodiments of the present application, and should not be regarded as limitation on other specific embodiments of the present application which are not elaborated herein.

In the following illustration, the specific embodiments of the present application will be illustrated by referring to steps executed by one or more computers and symbols, unless otherwise indicated. Therefore, these steps and operations can be implemented by hardware plus software, and can be executed by a computer or a processor.

The term "module" used herein can be regarded as a software object executed on a computing system. The different components, modules, engines and services described herein can be regarded as implementation objects on the computing system.

The embodiments of the present application provide a live human face verification method and device.

Figure 1A:
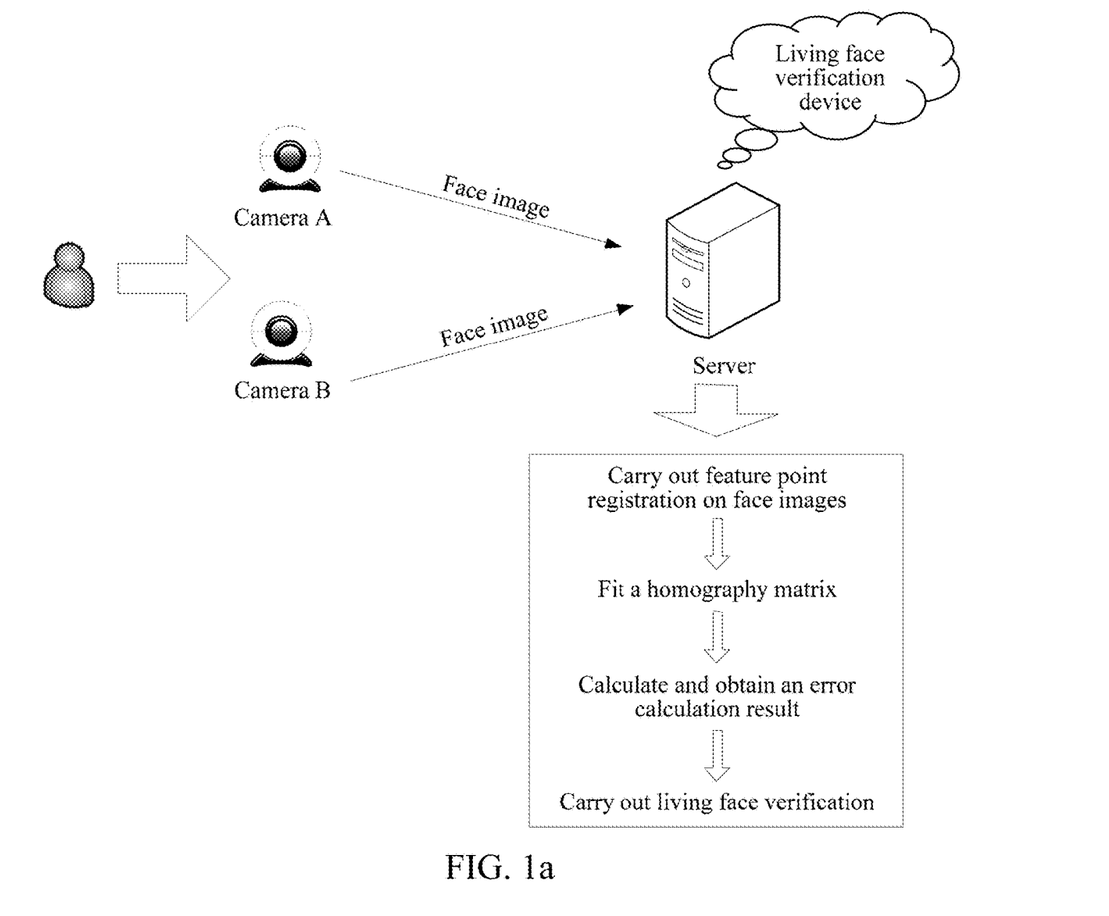
FIG. 1a is a scene schematic diagram of a live human face verification method provided by the embodiments of the present application.

Referring to FIG. 1a, the drawing is a scene schematic diagram of the live human face verification method provided by the embodiments of the present application. The scene may comprise the live human face verification device, which can be called as a face verification device for short. The device may be implemented by a specified computing device or integrated into certain computing devices, such as a server, and, for example, may serve as an application running in the server, a card plugged in an expansion slot of the server, etc. The device may be used for acquiring face images captured by at least two cameras, for example, face images captured by a camera A and a camera B, and then performing feature point registration on the face images according to preset face feature points, to obtain corresponding feature point combinations between the face images, for example, performing five-sense organ registration on the face images; then utilizing preset algorithms to fit out a homography transformation matrix among the feature point combinations; finally calculating transformation errors of the feature point combinations using the homography transformation matrix to obtain an error calculation result, and performing live human face verification of the face images according to the error calculation result, for example, if the error calculation result meets a preset threshold, then determining that a result of live human face verification is "passed".

The embodiments of the present application do not need to calibrate the cameras, so calibration errors in the process of camera calibration in the existing technology are eliminated. The method of the embodiments of the present application directly carries out feature point matching on captured face images, fits out the homography transformation matrix and, after obtaining an error calculation result using the homography transformation matrix, carries out live human face verification, and therefore, compared with the existing living body detection technology, the method greatly reduces the amount of calculation of a living body judgment algorithm and increases the speed and real-time performance of living body detection.

In addition, the scene may further comprise a plurality of pick-up devices (i.e. cameras), which are mainly configured to capture image data and, when capturing face images, send the face images the face verification device to determine whether live human face verification is passed.

Some embodiments will be described from the perspective of the live human face verification device, and the live human face verification device may specifically be integrated into a network device, such as a server.

The live human face verification method includes: acquiring face images captured by at least two cameras; performing feature point registration on the face images according to preset face feature points, to obtain corresponding feature point combinations between the face images; utilizing preset algorithms to fit out a homography transformation matrix among the feature point combinations; calculating transformation errors of the feature point combinations using the homography transformation matrix to obtain an error calculation result, and performing live human face verification of the face images according to the error calculation result.

Figure 1B:
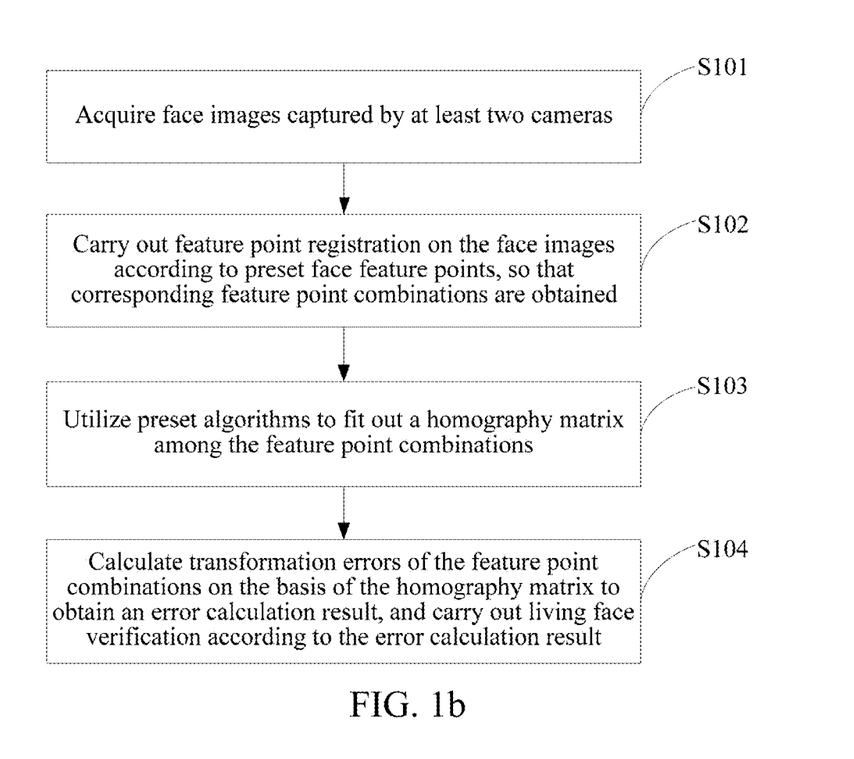
FIG. 1b is a flow schematic diagram of the live human face verification method provided by the embodiments of the present application.

Referring to FIG. 1b, FIG. 1b is a flow schematic diagram of the live human face verification method provided by the embodiments of the present application. The method may include the following steps.

In step S101, acquire face images captured by at least two cameras.

It may be understood that in the embodiments of the present application, the step of acquiring, by the live human face verification device, the face images captured by at least two cameras may specially include:

Step 1: Acquiring image data captured by at least two cameras.

Step 2: Carrying out face detection on the image data to obtain a face detection result.

Step 3: When the face detection result indicates that face images are detected, acquiring the face images.

Face detection is a key step in an automatic face recognition system, and means that for any given image, a certain strategy is adopted for searching the image to determine whether a face is contained in it or not, and if so, then the position, size and posture of the face are returned. It can be easily thought of that the present embodiment can adopt the existing face detection algorithm to carry out analysis and recognition on the acquired image data, and the process of face detection will not be specified here.

That is to say, a plurality of cameras (two or more) collect image data, and send the image data to the live human face verification device in real time, and the live human face verification device carries out face detection on the received image data and, when it is determined that face images are detected, acquires the face images to carry out living body verification.

In some embodiments, the cameras may also directly carry out face detection on the collected image data and, when face images are detected, acquire the face images and send the face images to the live human face verification device for living body verification.

In step S102, carry out feature point registration on the face images according to preset face feature points, to obtain corresponding feature point combinations between the face images.

For example, the live human face verification device carries out feature point registration (i.e. five-sense organ registration) on the face images according to the number and positions of the preset face feature points, so that the corresponding feature point combinations can be obtained.

For another example, if two cameras are available, after acquiring face images captured by the two cameras, the live human face verification device can carry out feature point registration on the two face images according to the preset face feature points, so that a plurality of feature point combinations, also called feature point pairs, are obtained.

In the embodiments of the present application, feature point registration means a process that a plurality of face images which are acquired by a plurality of cameras within the same area according to different imaging means are subject to matching and superposition, including geometric correction, projection transformation, scale unification and other processing.

In some embodiments, if two cameras are available, then the registration process of the live human face verification device may be as follows: feature extraction is first carried out on two face images, so that feature points are obtained; matched feature point pairs are found by performing similarity measurement; image spatial coordinate transformation parameters are then obtained by means of the matched feature point pairs; and finally, image registration is carried out by means of the coordinate transformation parameters. The existing feature extraction algorithm can be adopted to carry out feature point registration on the images, which is not specifically described herein.

In step S103, utilize preset algorithms to fit out a homography transformation matrix among the feature point combinations.

In some embodiments, the live human face verification device can utilize a preset random sampling consensus algorithm to fit the feature point combinations to generate the homography transformation matrix using a least square method.

The random sampling consensus algorithm (Ransac algorithm) in the embodiments of the present application basically assumes that samples include inliers (data capable of being described by a model) as well as outliers (data deviating far away from a normal range and failing to adapt to a mathematic model), that is, a data set contains noise. These outliers may be generated by wrong measurement, wrong hypothesis, wrong calculation, etc. Moreover, the Ransac algorithm also assumes that given a set of inliers, a method which is capable of working out model parameters consistent with these data exists.

The least square method is to look for optimum function matching of data through minimizing the quadratic sum of errors. By utilizing the least square method, unknown data can be easily obtained, and the quadratic sum of the errors between these obtained data and actual data is made minimum.

That is to say, by means of the random sampling consensus algorithm and the least square method, the live human face verification device can calculate and fit out a model corresponding to the feature point combinations, i.e. the homography transformation matrix; and further, the step of fitting the feature point combinations to generate the homography transformation matrix may specifically include:

Step a: In the form of homogeneous coordinates, marking each feature point pair in the feature point combinations;

Step b: Creating a matrix model, and determining a corresponding relation between each feature point pair by means of the matrix model;

Step c: Carrying out homogeneous transformation on the corresponding relations to generate homogeneous corresponding relations;

Step d: Fitting the feature point combinations on the basis of the homogeneous corresponding relations to generate the homography transformation matrix.

The homogeneous coordinates mean that a vector which is n-dimensional originally is represented by using a n+1-dimensional vector; for example, if two cameras are arranged, it is assumed that P1 and P2 are homogeneous coordinates of a pair of corresponding feature points in two face images, a matrix model H of the homography transformation matrix is created, and thereby, by means of the homography transformation matrix H, a corresponding relation between P1 and P2 can be P2=H*P1.

Further, for example, if the matrix model H of the homography transformation matrix is a 3×3 matrix, for normalization, h33 (i.e. the last element) in the matrix model H is equal to 1, and then H*P1 is transformed into a homogeneous corresponding relation; and because a pair of feature points can generate two equations (before and after homogeneous transformation), the determination of eight unknown parameters of the matrix model H needs at least four feature point pairs. Thus, the Ransac algorithm and the least square method can be used for fitting a matrix model H for each feature point pair, thus obtaining the homography transformation matrix corresponding to the matrix model H. Note that the determination of eight unknown parameters of the homography transformation matrix only requires the spatial information of the feature points combinations of the images captured by the two cameras and it does not require or depend on the prior knowledge of the relative location of the two cameras. This feature makes it more convenient for configuring the locations of the cameras used for capturing the images because the conventional approaches often requires that the relative location information between the two cameras be known and such location information is often used for determining the homography transformation matrix. As a result, the conventional approach often restricts that the two cameras be placed side by side whereas the method of the present application does not have such restriction. Moreover, the flexibility of the method of the present application also allows more than two cameras to be used for capturing the images and therefore produces more estimate of the homography transformation matrix using more than two images, thereby further improving the accuracy of the live human face verification results.

In step S104, calculate transformation errors of the feature point combinations using the homography transformation matrix to obtain an error calculation result, and carry out live human face verification of the face images according to the error calculation result.

It may be understood that calculating, by the live human face verification device, the transformation errors of the feature point combinations using the homography transformation matrix to obtain the error calculation result may specifically include:

Step A: For each feature point combination, calculating corresponding transformation error using the homography transformation matrix.

Step B: Carrying out mean value calculation according to the corresponding transformation error of each feature point combination, to obtain a mean error, and determining the mean error as the error calculation result.

For example, for each feature point combination, the live human face verification device calculates the corresponding transformation error using the homography transformation matrix, wherein the transformation errors are errors of the feature point combinations which are obtained before and after homogeneous transformation using the homography transformation matrix; if fifty feature points are set in advance, then fifty corresponding feature point combinations are obtained, and mean value calculation is carried out on the transformation errors of the fifty feature point combinations, to obtain a mean error.

Further, for example, if the feature point combination includes two feature points, then each feature point pair corresponds to a transformation error; if fifty feature points are set in advance, then fifty corresponding feature point pairs are obtained, and mean value calculation is carried out on the transformation errors of the fifty feature point pairs, so that the mean error is obtained.

It may be understood that if the feature point combination includes three feature points, then with a middle camera as comparison, two errors may exist in each feature point combination; in some more accurate cases, more errors can be set for comparison, for example, if the feature point combination includes three feature points, a transformation error exists between each feature point pair, then three errors may exist in each feature point combination, and this will not be specified herein.

In some embodiments, performing live human face verification of the face images according to the error calculation result may specifically include:

Step 1: If the mean error indicated by the error calculation result is less than or equal to a preset threshold, then determining that a result of live human face verification is "passed";

Step 2: If the mean error indicated by the error calculation result is greater than the preset threshold, then determining that a result of live human face verification is "not passed".

That is to say, after the mean error of the transformation errors is worked out, the mean error is compared with the preset threshold; if the mean error is less than or equal to the preset threshold, then it can be considered that the result of live human face verification is "passed", that is, acquired face images are a real person, and face recognition is then carried out; and if the mean error is greater than the preset threshold, then it can be considered that the result of live human face verification is "not passed", that is, the acquired face images are a false body.

It can been known from the above that when at least two cameras capture face images, the live human face verification method provided by the embodiments of the present application first carries out feature point registration on the face images according to preset face feature points, to obtain corresponding feature point combinations between the face images, then utilizes the preset algorithms to fit out a homography transformation matrix among the feature point combinations, and finally calculates transformation errors of these feature point combinations using the homography transformation matrix and thereby carries out live human face verification of the face images according to the error calculation result; the embodiments of the present application do not need to calibrate the cameras, so that calibration errors are eliminated, directly carry out feature point matching on the captured face images, and fit out the homography transformation matrix, so the amount of calculation of the living body judgment algorithm can be reduced; moreover, the cameras can be freely placed, and thereby the flexibility and convenience of living body judgment can be increased.

In some embodiments, the live human face verification method provided by the method is mainly applied to office access control systems. Before face recognition is carried out, the method is first used for performing living body verification, and when live human face verification is passed, face recognition is then carried out; the method adopts two or more cameras which are freely placed, and by analyzing a three-dimensional geometric relation between five sense organ points in a plurality of face images shot simultaneously by a plurality of cameras and utilizing the homography of feature point pairs in plane analytic geometry, the method carries out live human face verification without requiring the cooperation of a user.

Taking two cameras as an example, the live human face verification method will be elaborated, wherein the two cameras are respectively arranged on the side of a doorframe, and are normally placed along a vertical direction in order to save space.

Figure 2A:
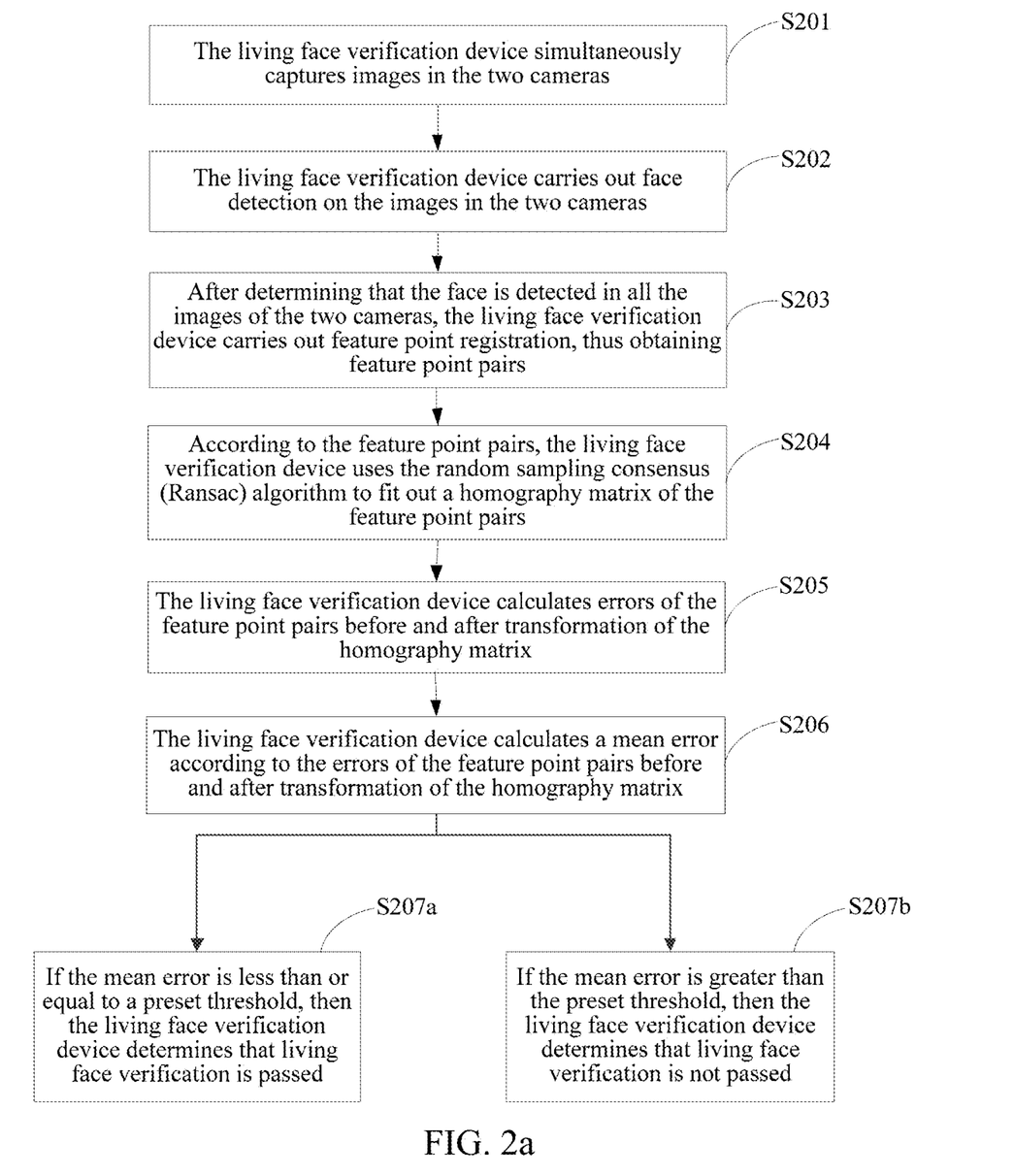
FIG. 2a is a flow schematic diagram of the live human face verification method provided by the embodiments of the present application.

Referring to FIG. 2a, FIG. 2a is a flow schematic diagram of the live human face verification method provided by the embodiments of the present application. The method may include the following steps:

In step S201, the live human face verification device simultaneously captures images in the two cameras.

For example, the camera A and the camera B are respectively arranged on the side of the doorframe, and can be freely placed, not only supporting placement along a horizontal direction or a vertical direction, but also allowing a certain horizontal or vertical offset and included angle to exist between the cameras, so actual deployment is convenient and flexible. It may be understood that the camera A and the camera B are normally placed along the vertical direction in order to save space.

In step S202, the live human face verification device carries out face detection on the images in the two cameras.

For example, the camera A and the camera B send the captured images to the live human face verification device, the live human face verification device carries out face detection on the received images, that is, detecting whether a face exists in the images or not, wherein face detection means that for any given image, a certain strategy is adopted for searching the image to determine whether the image contains the face or not. It can be easily thought of that the present embodiment can adopt the existing face detection algorithm to carry out analysis and recognition on the acquired image data.

In step S203, after determining that the face is detected in all the images of the two cameras, the live human face verification device carries out feature point registration, thus obtaining feature point pairs.

Figure 2B:
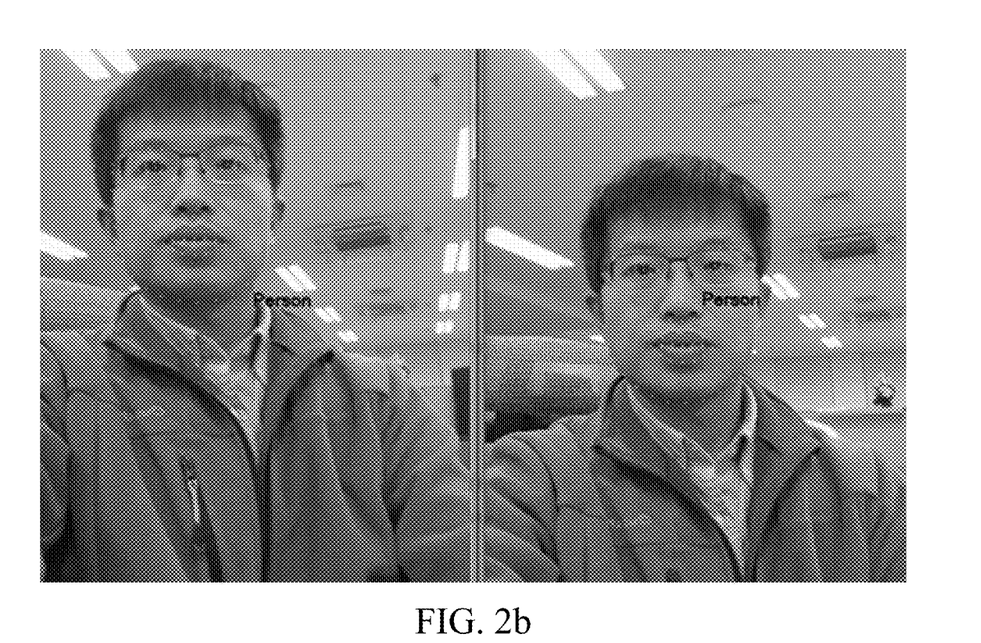
FIG. 2b is a schematic diagram of feature point registration in the live human face verification method provided by the embodiments of the present application.

For example, when both the camera A and the camera B detect the face, the live human face verification device will carry out feature point registration on the two face images, i.e. five-sense organ registration. In the present embodiment, ninety feature points are preset in the live human face verification device, these two groups of feature point pairs are in one-to-one correspondence, shown in FIG. 2b are two face images which are simultaneously captured by the camera A and the camera B arranged along the vertical direction, and the points marked on the face are registered fiver-sense organ feature points.

In step S204, according to the feature point pairs, the live human face verification device uses the random sampling consensus (Ransac) algorithm to fit out a homography transformation matrix of the feature point pairs.

Firstly, it is assumed that $P1(x1, y1, 1)T$ and $P2(x2, y2, 1)T$ are homogeneous coordinates of a pair of corresponding feature points in the two face images, a matrix model H of the homography transformation matrix is created as follows, and then by means of the matrix model H of the homography transformation matrix, a corresponding relation between P1 and P2 is $P2=H*P1$.

H is a 3×3 matrix:

$$H = \begin{pmatrix} h_{11} & h_{12} & h_{13} \\ h_{21} & h_{22} & h_{23} \\ h_{31} & h_{32} & h_{33} \end{pmatrix};$$

For normalization, h33 in the homography transformation matrix H is set as 1. Coordinates transformed by H*P1 are:

$$H * P_1 = \begin{pmatrix} h_{11} & h_{12} & h_{13} \\ h_{21} & h_{22} & h_{23} \\ h_{31} & h_{32} & 1 \end{pmatrix} \begin{pmatrix} x_1 \\ y_1 \\ 1 \end{pmatrix} = \begin{pmatrix} x_1 h_{11} + y_1 h_{12} + h_{13} \\ x_1 h_{21} + y_1 h_{22} + h_{23} \\ x_1 h_{31} + y_1 h_{32} + 1 \end{pmatrix}; \quad (1)$$

H*P1 undergoes homogeneous transformation to become homogeneous, obtaining:

$$\begin{pmatrix} \dfrac{x_1 h_{11} + y_1 h_{12} + h_{13}}{x_1 h_{31} + y_1 h_{32} + 1} \\ \dfrac{x_1 h_{21} + y_1 h_{22} + h_{23}}{x_1 h_{31} + y_1 h_{32} + 1} \\ 1 \end{pmatrix} = \qquad (2)$$

$$\begin{pmatrix} x_2 \\ y_2 \\ 1 \end{pmatrix} \Rightarrow \begin{cases} x_1 h_{11} + y_1 h_{12} + h_{13} - x_2 x_1 h_{31} - x_2 y_1 h_{32} - x_2 = 0 \\ x_1 h_{21} + y_1 h_{22} + h_{23} - x_1 y_2 h_{31} - y_1 y_2 h_{32} - y_2 = 0 \end{cases}; \text{i.e.}$$

$$\begin{pmatrix} x_2 \\ y_2 \end{pmatrix} = \begin{pmatrix} x_1 & y_1 & 1 & 0 & 0 & 0 & -x_1 x_2 & -x_2 y_1 \\ 0 & 0 & 0 & x_1 & y_1 & 1 & -x_1 y_2 & -y_1 y_2 \end{pmatrix} \begin{pmatrix} h_{11} \\ h_{12} \\ h_{13} \\ h_{21} \\ h_{22} \\ h_{23} \\ h_{31} \\ h_{32} \\ 1 \end{pmatrix}; \qquad (3)$$

As a pair of feature points can generate two equations (before and after homogeneous transformation), the determination of eight unknown parameters of the matrix model H needs at least four feature point pairs. In the present embodiment, for example, the Ransac algorithm and the least square method can be used for fitting the matrix model H for the ninety feature point pairs, thus obtaining the homography transformation matrix corresponding to the matrix model H.

In step S205, the live human face verification device calculates errors of the feature point pairs before and after transformation of the homography transformation matrix.

For example, the live human face verification device calculates errors of the ninety feature point pairs before and after homogeneous transformation of the homography transformation matrix, the ninety feature point pairs are respectively substituted into (1) and (2), so that errors of Euclidean distance e=‖H*P1−P2‖2 before and after the homogeneous transformation can be worked out, wherein Euclidean distance is a commonly adopted distance definition, and it is a true distance between two points in an m-dimensional space.

In step S206, the live human face verification device calculates a mean error according to the errors of the feature point pairs before and after transformation of the homography transformation matrix.

For example, the live human face verification device sets ninety feature points in advance, then ninety corresponding feature point pairs are obtained, and then mean value calculation is carried out according to the transformation errors of the ninety feature point pairs, to obtain a mean error.

In step S207a, if the mean error is less than or equal to a preset threshold, then the live human face verification device determines that live human face verification is passed.

In step S207b, if the mean error is greater than the preset threshold, then the live human face verification device determines that live human face verification is not passed.

Finally, the live human face verification device compares the mean error with the preset threshold h to judge whether it is a real person or a false body; if the mean error is less than or equal to the present threshold, it is determined that live human face verification is passed, that is, the images are the real person, face recognition is carried out when the living body verification of the face is passed, and a door is opened if face recognition is passed, or is not opened if face recognition is not passed; if the mean error is greater than the preset threshold, it is determined that live human face verification is not passed, that is, the images are a false body, and the door is not opened.

The method described by the present embodiment adopts two or more freely placed cameras, and by means of a three-dimensional geometric relation between five sense organ points in a plurality of face images shot simultaneously by the cameras, by utilizing the homography of feature point pairs in plane analytic geometry, the method directly carries out face feature point pair matching on the images shot by the plurality of cameras to carry out live human face verification without requiring camera calibration or user's cooperation. The method can effectively distinguish the face of a real person and a plane false body (such as a picture or a video played on a mobile device (such as a mobile phone or a tablet computer) or a piece of printed face paper) without calibrating the cameras. The degree of freedom of placement of the plurality of cameras in the method is high, not only is placement along a horizontal direction or a vertical direction supported, but also a certain horizontal or vertical offset and included angle is allowed to exist between the cameras, and therefore the actual deployment of a binocular system is more convenient and flexible.

It may be understood that the method is applicable to not only various access control systems, such as office access control systems, but also other systems requiring living body verification.

It can been known from the above that when at least two cameras capture face images, the live human face verification method provided by the embodiments of the present application first carries out feature point registration on the face images according to preset face feature points, to obtain corresponding feature point combinations between the face images, then utilizes the preset algorithms to fit out a homography transformation matrix among the feature point combinations, and finally calculates transformation errors of these feature point combinations using the homography transformation matrix and thereby carries out live human face verification according to an error calculation result; the embodiments of the present application do not need to calibrate the cameras, so that calibration errors are eliminated, directly carry out feature point matching on the captured face images, and fit out the homography transformation matrix, so the amount of calculation of the living body judgment algorithm can be reduced; moreover, the cameras can be freely placed, and thereby the flexibility and convenience of living body judgment can be increased.

In order to better implement the live human face verification method provided by the embodiments of the present application, the embodiments of the present application further provide a device based on the live human face verification method. The meanings of the nouns are the same as that in the above-mentioned live human face verification method, and for specific implementation details, please refer to the description in the method embodiments.

Figure 3A:
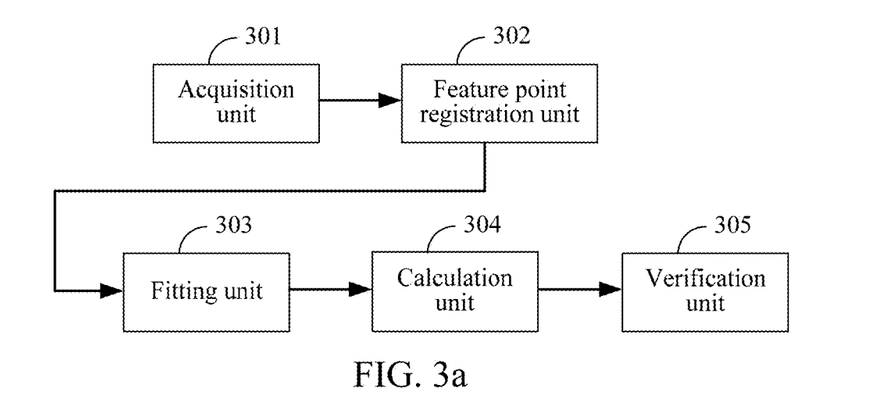
FIG. 3a is a structural schematic diagram of a live human face verification device provided by the embodiments of the present application.

Referring to FIG. 3a, FIG. 3a is a structural schematic diagram of the live human face verification device provided by the embodiments of the present application, and the live human face verification device may comprise an acquisition unit 301, a feature point registration unit 302, a fitting unit 303, a calculation unit 304, and a verification unit 305.

The acquisition unit 301 is configured to acquire face images captured by at least two cameras; and the feature point registration unit 302 is configured to carry out feature point registration on the face images according to preset face feature points, to obtain corresponding feature point combinations between the face images.

The fitting unit 303 is configured to utilize preset algorithms to fit out a homography transformation matrix among the feature point combinations; the calculation unit 304 is configured to calculate transformation errors of the feature point combinations using the homography transformation matrix to obtain an error calculation result; and the verification unit 305 is configured to carry out live human face verification of the face images according to the error calculation result.

Figure 3B:
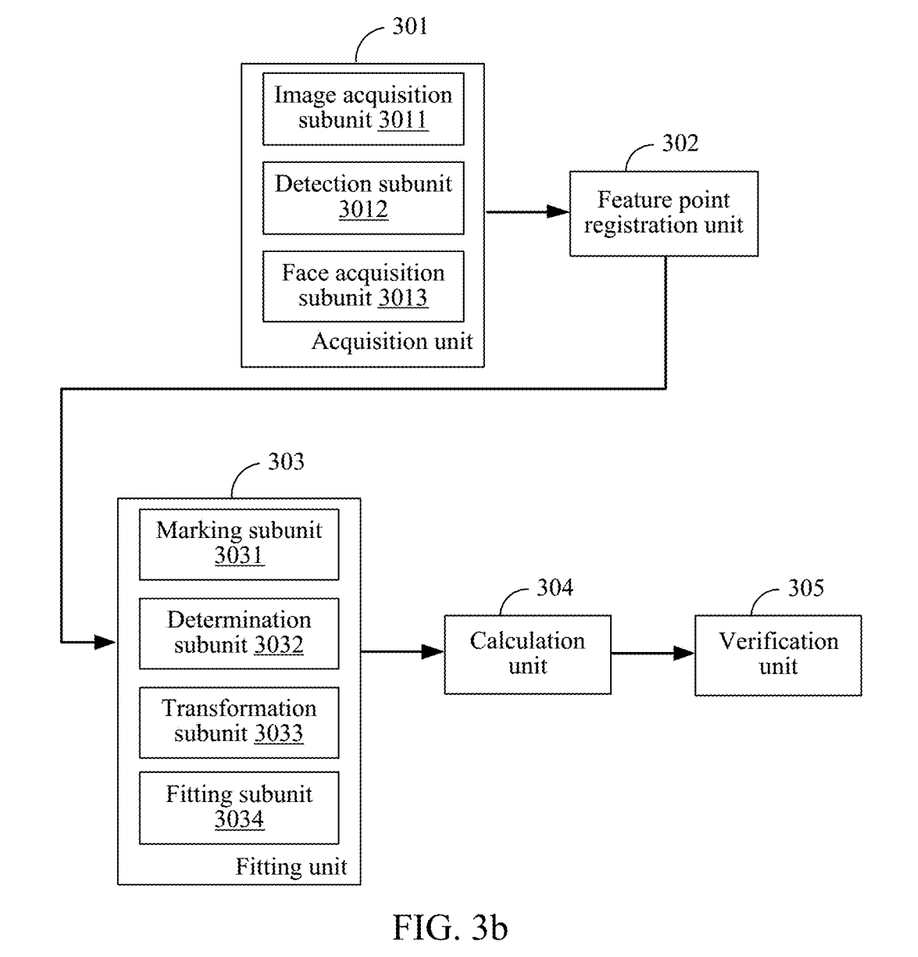
FIG. 3b is another structural schematic diagram of the live human face verification device provided by the embodiments of the present application.

Also referring to FIG. 3b, FIG. 3b is another structural schematic diagram of the live human face verification device provided by the embodiments of the present application, and the acquisition unit 301 may comprise:

an image acquisition subunit 3011 configured to acquire image data captured by at least two cameras;

a detection subunit 3012 configured to carry out face detection on the image data to obtain a face detection result; and a face acquisition subunit 3013 configured to acquire face images when the face detection result indicates that the face images are detected.

Face detection is a key step in an automatic face recognition system, and means that for any given image, a certain strategy is adopted for searching the image to determine whether a face is contained in it or not, and if so, then the position, size and posture of the face are returned. It can be easily thought of that the present embodiment can adopt the existing face detection algorithm to carry out analysis and recognition on the acquired image data, and the process of face detection will not be specified here.

That is to say, a plurality of cameras (two or more) collect image data, and send the image data to the live human face verification device in real time, and the live human face verification device carries out face detection on the received image data, and when it is determined that face images are detected, acquires the face images to carry out living body verification.

In some embodiments, the cameras may also directly carry out face detection on the collected image data, and when face images are detected, acquire the face images and send the face images to the live human face verification device for living body verification.

Subsequently, the feature point registration unit 302 can be used for performing feature point registration on the face images according to preset face feature points, to obtain corresponding feature point combinations between the face images.

For example, the live human face verification device carries out feature point registration (i.e. five-sense organ registration) on the face images according to the number and positions of the preset face feature points, so that the corresponding feature point combinations can be obtained.

For another example, if two cameras are available, after acquiring face images captured by the two cameras, the live human face verification device can carry out feature point registration on the two face images according to the preset face feature points, so that a plurality of feature point combinations, also called feature point pairs, are obtained.

In the embodiments of the present application, feature point registration means a process that a plurality of face images which are acquired by a plurality of cameras within the same area according to different imaging means are subject to matching and superposition, including geometric correction, projection transformation, scale unification and other processing.

Further, if two cameras are available, then the registration process of the live human face verification device may be as follows: feature extraction is first carried out on two face images, so that feature points are obtained; matched feature point pairs are found by performing similarity measurement; image spatial coordinate transformation parameters are then obtained by means of the matched feature point pairs; and finally, image registration is carried out by means of the coordinate transformation parameters. The existing feature extraction algorithm can be adopted to carry out feature point registration on the images, which is not specified herein.

Then, the fitting unit 303 can be specifically configured to utilize a preset random sampling consensus algorithm to fit the feature point combinations to generate the homography transformation matrix using a least square method.

The random sampling consensus algorithm (Ransac algorithm) in the embodiments of the present application basically assumes that samples include inliers as well as outliers, that is, a data set contains noise. These outliers may be generated by wrong measurement, wrong hypothesis, wrong calculation, etc. Moreover, the Ransac algorithm also assumes that given a set of inliers, a method which is capable of working out model parameters consistent with these data exists.

The least square method is to look for optimum function matching of data through minimizing the quadratic sum of errors. By utilizing the least square method, unknown data can be easily obtained, and the quadratic sum of the errors between these obtained data and actual data is made minimum.

That is to say, by means of the random sampling consensus algorithm and the least square method, the live human face verification device can calculate and fit out a model corresponding to the feature point combinations, i.e. the homography transformation matrix; and further, the fitting unit 303 may specifically comprise:

a marking subunit 3031 configured to mark each feature point pair in the feature point combinations in the form of homogeneous coordinates;

a determination subunit 3032 configured to create a matrix model and determine a corresponding relation between each feature point pair by means of the matrix model;

a transformation subunit 3033 configured to carry out homogeneous transformation on the corresponding relations to generate homogeneous corresponding relations; and a fitting subunit 3034 configured to fit the feature point combinations on the basis of the homogeneous corresponding relations to generate the homography transformation matrix.

The homogeneous coordinates mean that a vector which is n-dimensional originally is represented by using a n+1-dimensional vector; for example, if two cameras are arranged, it is assumed that P1 and P2 are homogeneous coordinates of a pair of corresponding feature points in two face images, a matrix model H of the homography transformation matrix is created, and thereby, by means of the homography transformation matrix H, a corresponding relation between P1 and P2 can be P2=H*P1.

Further, for example, if the matrix model H of the homography transformation matrix is a 3×3 matrix, for normalization, h33 (i.e. the last element) in the matrix model H is equal to 1, and then H*P1 is transformed into a homogeneous corresponding relation; and because a pair of feature points can generate two equations (before and after homogeneous transformation), the determination of eight unknown parameters of the matrix model H needs at least four feature point pairs. Thus, the Ransac algorithm and the least square method can be used for fitting a matrix model H for each feature point pair, thus obtaining the homography transformation matrix corresponding to the matrix model H.

It may be understood that the calculation unit 304 can be specifically configured to calculate a corresponding transformation error for each feature point combination using the homography transformation matrix, carry out mean value calculation according to the corresponding transformation error of each feature point combination to obtain a mean error, and determine the mean error as an error calculation result.

For example, for each feature point combination, the live human face verification device calculates the corresponding transformation error using the homography transformation matrix, wherein the transformation errors are errors of the feature point combinations which are obtained before and after homogeneous transformation using the homography transformation matrix; if fifty feature points are set in advance, then fifty corresponding feature point combinations are obtained, and mean value calculation is carried out on the transformation errors of the fifty feature point combinations, to obtain a mean error.

Further, for example, if the feature point combination includes two feature points, then each feature point pair corresponds to a transformation error; if fifty feature points are set in advance, then fifty corresponding feature point pairs are obtained, and mean value calculation is carried out on transformation errors of the fifty feature point pairs, to obtain a mean error.

For another example, if the feature point combination includes three feature points, then with a middle camera as comparison, two errors may exist in each feature point combination; in some more accurate cases, more errors can be set for comparison, for example, if the feature point combination includes three feature points, a transformation error exists between each feature point pair, then three errors may exist in each feature point combination, and this will not be specified herein.

Further, the verification unit 305 can be specifically configured to determine that a result of live human face verification is "passed" if the mean error indicated by the error calculation result is less than or equal to a preset threshold or determine that a result of live human face verification is "not passed" if the mean error indicated by the error calculation result is greater than the preset threshold.

That is to say, after the mean error of the transformation errors is worked out, the mean error is compared with the preset threshold; if the mean error is less than or equal to the preset threshold, then it can be considered that the result of live human face verification is "passed", that is, acquired face images are a real person, and face recognition is then carried out; and if the mean error is greater than the preset threshold, then it can be considered that the result of live human face verification is "not passed", that is, the acquired face images are a false body.

In specific implementation, each unit above can be implemented as a separate entity, or can also be optionally combined to be implemented as a single entity or a plurality of entities, and for the specific implement of each unit above, please refer to the above method embodiments, which are not repeated here.

The live face verification device can be specifically integrated into a network device, such as a server.

It can be known from the above that when at least two cameras capture face images, the live human face verification device provided by the embodiments of the present application first carries out feature point registration on the face images according to preset face feature points, to obtain corresponding feature point combinations between the face images, then utilizes the preset algorithms to fit out a homography transformation matrix among the feature point combinations, and finally calculates transformation errors of these feature point combinations using the homography transformation matrix and thereby carries out live human face verification according to an error calculation result; the embodiments of the present application do not need to calibrate the cameras, so that calibration errors are eliminated, directly carry out feature point matching on the captured face images, and fit out the homography transformation matrix, so the amount of calculation of the living body judgment algorithm can be reduced; moreover, the cameras can be freely placed, and thereby the flexibility and convenience of living body judgment can be increased.

Figure 4:
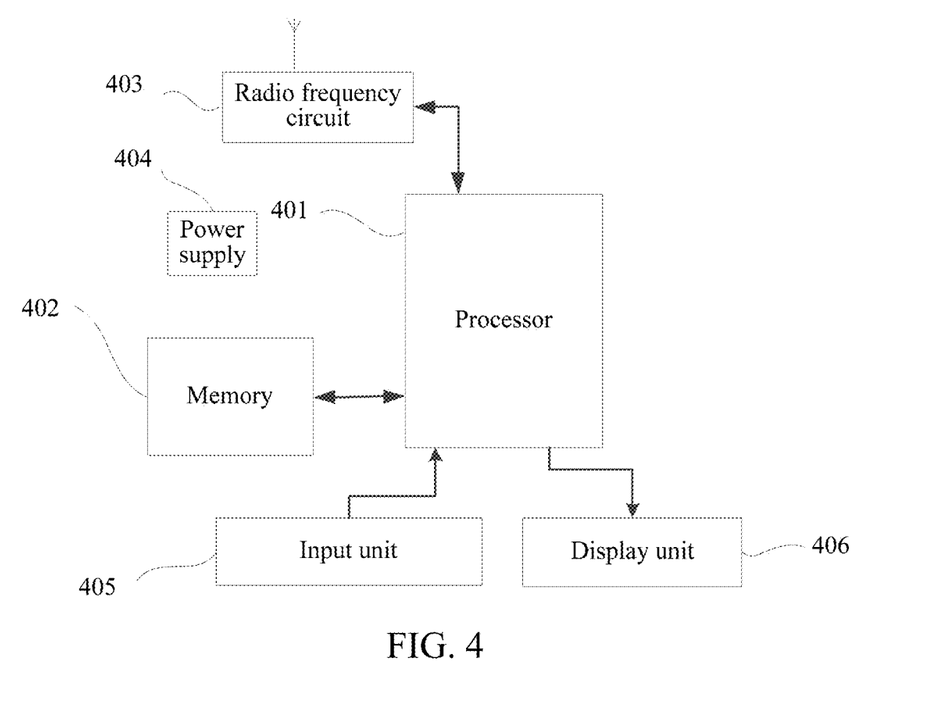
FIG. 4 is a structural schematic diagram of a server provided by the embodiments of the present application.

The embodiments of the present application further provide a server, in which the live human face verification device of the embodiments of the present application can be integrated. FIG. 4 shows a structural schematic diagram of the server involved in the embodiments of the present application.

The server may comprise a processor 401 with one or more processing cores, a memory 402 with one or more non-transitory computer-readable storage media, a radio frequency (RF) circuit 403, a power supply 404, an input unit 405, a display unit 406, and other parts. Those skilled in the art may understand that the sever structure shown in FIG. 4 does not constitute a limitation on the server, and the server in each embodiment may comprise more or less parts than in the drawing or the combination of certain parts or different part arrangements. For example, the server in some embodiments may not have the RF circuit 403 and/or the display unit 406.

The processor 401 is a control center of the server, various interfaces and lines are utilized to connect every part of the whole server, and by running or executing software programs and/or modules stored in the memory 402 and calling data stored in the memory 402, various functions of the server are executed and data is processed, so that the whole server is monitored. In some embodiments, the processor 401 may comprise one or more processing cores. In some embodiments, the processor 401 may be integrated with an application processor and a modulation/demodulation processor, wherein the application processor mainly processes an operating system, user interfaces, application programs, etc., and the modulation/demodulation processor mainly processes wireless communication. It may be understood that the above-mentioned modulation/demodulation processor may also not be integrated into the processor 401.

The memory 402 can be configured to store the software programs and the modules, and by running the software programs and the modules stored in the memory 402, the processor 401 executes various functional applications and processes data. The memory 402 may mainly comprise a program storage area and a data storage area. The program storage area can store the operating system, at least one function-needed application program (such as a sound playing function, an image playing function, etc.), etc. The data storage area can store data which is created according to the usage of the server. In addition, the memory 402 may comprise a high-speed random access memory, and may also comprise a non-volatile memory, such as at least one disk storage device or flash memory device or other volatile solid-state storage devices. Correspondingly, the memory

402 may also comprise a memory controller in order for the processor 401 to access the memory 402.

Specifically, in the present embodiment, the processor 401 in the server will load executable files corresponding to processes of one or more application programs into the memory 402 according to the following instructions, and the processor 401 will run the application programs stored in the memory 402, thus performing various functions. For example, the processor 401 can run the application programs stored in the memory 402 to execute the following operations:

acquire face images captured by at least two cameras;

carry out feature point registration on the face images according to preset face feature points, to obtain corresponding feature point combinations between the face images;

utilize preset algorithms to fit out a homography transformation matrix among the feature point combinations;

calculate transformation errors of the feature point combinations using the homography transformation matrix to obtain an error calculation result, and carry out live human face verification of the face images according to the error calculation result.

In some embodiments, the processor 401 can also be configured to acquire image data captured by at least two cameras, carry out face detection on the image data to obtain a face detection result, and, when the face detection result indicates that face images are detected, acquire the face images.

In some embodiments, the processor 401 can also be configured to utilize a preset random sampling consensus algorithm to fit the feature point combinations to generate the homography transformation matrix using a least square method.

In some embodiments, the processor 401 can also be configured to mark each feature point pair in the feature point combinations in the form of homogeneous coordinates, create a matrix model, determine a corresponding relation between each pair of feature points by means of the matrix model, carry out homogeneous transformation on the corresponding relations to generate homogeneous corresponding relations, and fit the feature point combinations on the basis of the homogeneous corresponding relations to generate the homography transformation matrix.

In some embodiments, the processor 401 can also be configured to calculate a corresponding transformation error for each feature point combination using the homography transformation matrix, carry out mean value calculation according to the corresponding transformation error of each feature point combination to obtain a mean error, and determine the mean error as the error calculation result.

In some embodiments, the processor 401 can also be configured to determine that a result of live human face verification is "passed" if the mean error indicated by the error calculation result is less than or equal to a preset threshold or determine that a result of live human face verification is "not passed" if the mean error indicated by the error calculation result is greater than the preset threshold.

It can been known from the above that in the server provided by the embodiments of the present application, when at least two cameras capture face images, feature point registration is first carried out on the face images according to preset face feature points, to obtain corresponding feature point combinations between the face images; preset algorithms are then utilized to fit out a homography transformation matrix among the feature point combinations; finally, transformation errors of these feature point combinations are calculated using the homography transformation matrix, and thereby live human face verification is carried out according to an error calculation result. The embodiments of the present application do not need to calibrate the cameras, so that calibration errors are eliminated, directly carry out feature point matching on the captured face images, and fit out the homography transformation matrix, so the amount of calculation of the living body judgment algorithm can be reduced; moreover, the cameras can be freely placed, and thereby the flexibility and convenience of living body judgment can be increased.

In the above-mentioned embodiments, the description of each embodiment has its own focus, and for parts in a certain embodiment which are not described in detail, please refer to the detailed description for the live human face verification method above, which is not repeated again here.

The live human face verification device provided by the embodiments of the present application is, for example, a computer, a tablet computer, a mobile phone with a touch function, etc., the live human face verification device and the live human face verification method in the above embodiments belong to the same concept, and the live human face verification device can run any one of the methods provided by the embodiments of the live human face verification method.

It should be noted that for the live human face verification method described by the present application, ordinary testers in the art may understand that all or part of the flows of implementing the live human face verification method described by the embodiments of the present application can be carried out by a computer program through controlling related hardware, the computer program may be stored in a non-transitory computer-readable storage medium, such as a memory of a terminal, and executed by at least one processor in the terminal, and in the process of execution, for example, the flows of the embodiments of the live human face verification method may be included. The storage medium can be a disc, a compact disc, a read-only memory (ROM), a random access memory (RAM) or etc.

For the live human face verification device of the embodiments of the present application, each functional module may be integrated into a processing chip, or each module may separately physically exist, or two or more modules may be integrated into a module. The integrated modules may be implemented in the form of hardware or in the form of software functional modules. If the integrated modules are implemented in the form of software functional modules and sold or used as separate products, the integrated modules may also be stored in a non-transitory computer-readable storage medium, and the storage medium is, for example, a read-only memory, a disk, a compact disk or etc.

The live human face verification method and device provided by the embodiments of the present application have been introduced in detail above, the specific embodiments are applied herein to elaborate the principle and implementation ways of the present application, and the illustration of the above embodiments are merely intended to offer help in understanding the method of the present application and its core idea; moreover, for those skilled in the art, both the specific embodiments and the scope of application can be changed according to the idea of the present application, and to sum up, the contents of the description should not be understood as a limitation on the present application.

What is claimed is:

1. A live human face verification method performed at a computing device having one or more processors and memory storing a plurality of programs to be executed by the one or more processors, the method comprising:

acquiring, by the computing device, face images captured by at least two cameras without calibrating relative locations between the at least two cameras;

performing, by the computing device, feature point registration on the face images according to preset face feature points, to obtain corresponding feature point combinations between the face images, further including:

extracting feature points from two face images, each face image captured by a respective one of the at least two cameras;

performing similarity measurement on the extracted feature points to identify matched feature point pairs;

generating image spatial coordinate transformation parameters between the matched feature point pairs; and performing the feature point registration between the two face images by means of the image spatial coordinate transformation parameters;

utilizing, by the computing device, preset algorithms to fit out a homography transformation matrix among the feature point combinations;

calculating, by the computing device, transformation errors of the feature point combinations using the homography transformation matrix to obtain an error calculation result; and performing, by the computing device, live human face verification of the face images according to the error calculation result.

2. The live human face verification method according to claim 1, wherein the face images are captured simultaneously by the at least two cameras.

3. The live human face verification method according to claim 1, wherein the acquiring the face images captured by at least two cameras comprises:

acquiring image data captured by at least two cameras;

performing face detection on the image data to obtain a face detection result; and when the face detection result indicates that face images are detected, acquiring the face images.

4. The live human face verification method according to claim 1, wherein the utilizing the preset algorithms to fit out the homography transformation matrix among the feature point combinations comprises:

utilizing a preset random sampling consensus algorithm to fit the feature point combinations to generate the homography transformation matrix using a least square method.

5. The live human face verification method according to claim 4, wherein the fitting the feature point combinations to generate the homography transformation matrix comprises:

marking each feature point pair in the feature point combinations in the form of homogeneous coordinates;

creating a matrix model, and determining a corresponding relation between each feature point pair by means of the matrix model;

performing homogeneous transformation on the corresponding relations to generate homogeneous corresponding relations; and fitting the feature point combinations on the basis of the homogeneous corresponding relations to generate the homography transformation matrix.

6. The live human face verification method according to claim 1, wherein the calculating the transformation errors of the feature point combinations using the homography transformation matrix to obtain the error calculation result comprises:

for each feature point combination, calculating corresponding transformation error using the homography transformation matrix;

performing mean value calculation according to the corresponding transformation error of each feature point combination, to obtain a mean error; and determining the mean error as the error calculation result.

7. The live human face verification method according to claim 6, wherein the performing live human face verification of the face images according to the error calculation result comprises:

if the mean error indicated by the error calculation result is less than or equal to a preset threshold, then determining that a result of live human face verification is "passed"; and if the mean error indicated by the error calculation result is greater than the preset threshold, then determining that a result of live human face verification is "not passed".

8. A computing device for live human face verification comprising one or more processors, memory coupled to the one or more processors, and a plurality of programs stored in the memory that, when executed by the one or more processors, cause the computing device to execute the following operations:

acquiring, by the computing device, face images captured by at least two cameras without calibrating relative locations between the at least two cameras;

performing, by the computing device, feature point registration on the face images according to preset face feature points, to obtain corresponding feature point combinations between the face images, further including:

extracting feature points from two face images, each face image captured by a respective one of the at least two cameras;

performing similarity measurement on the extracted feature points to identify matched feature point pairs;

generating image spatial coordinate transformation parameters between the matched feature point pairs; and performing the feature point registration between the two face images by means of the image spatial coordinate transformation parameters;

utilizing, by the computing device, preset algorithms to fit out a homography transformation matrix among the feature point combinations;

calculating, by the computing device, transformation errors of the feature point combinations using the homography transformation matrix to obtain an error calculation result; and performing, by the computing device, live human face verification of the face images according to the error calculation result.

9. The computing device according to claim 8, wherein the face images are captured simultaneously by the at least two cameras.

10. The computing device according to claim 8, wherein the acquiring the face images captured by at least two cameras comprises:

acquiring image data captured by at least two cameras;

performing face detection on the image data to obtain a face detection result; and when the face detection result indicates that face images are detected, acquiring the face images.

11. The computing device according to claim 8, wherein the utilizing the preset algorithms to fit out the homography transformation matrix among the feature point combinations comprises:

utilizing a preset random sampling consensus algorithm to fit the feature point combinations to generate the homography transformation matrix using a least square method.

12. The computing device according to claim 11, wherein the fitting the feature point combinations to generate the homography transformation matrix comprises:

marking each feature point pair in the feature point combinations in the form of homogeneous coordinates;

creating a matrix model, and determining a corresponding relation between each feature point pair by means of the matrix model;

performing homogeneous transformation on the corresponding relations to generate homogeneous corresponding relations; and fitting the feature point combinations on the basis of the homogeneous corresponding relations to generate the homography transformation matrix.

13. The computing device according to claim 8, wherein the calculating the transformation errors of the feature point combinations using the homography transformation matrix to obtain the error calculation result comprises:

for each feature point combination, calculating corresponding transformation error using the homography transformation matrix;

performing mean value calculation according to the corresponding transformation error of each feature point combination, to obtain a mean error; and determining the mean error as the error calculation result.

14. The computing device according to claim 13, wherein the performing live human face verification of the face images according to the error calculation result comprises:

if the mean error indicated by the error calculation result is less than or equal to a preset threshold, then determining that a result of live human face verification is "passed"; and if the mean error indicated by the error calculation result is greater than the preset threshold, then determining that a result of live human face verification is "not passed".

15. A non-transitory computer readable storage medium storing a plurality of programs that, when executed by one or more processors of a computing device, cause the computing device to perform the following operations:

acquiring, by the computing device, face images captured by at least two cameras without calibrating relative locations between the at least two cameras;

performing, by the computing device, feature point registration on the face images according to preset face feature points, to obtain corresponding feature point combinations between the face images, further including:

extracting feature points from two face images, each face image captured by a respective one of the at least two cameras;

performing similarity measurement on the extracted feature points to identify matched feature point pairs;

generating image spatial coordinate transformation parameters between the matched feature point pairs; and performing the feature point registration between the two face images by means of the image spatial coordinate transformation parameters;

utilizing, by the computing device, preset algorithms to fit out a homography transformation matrix among the feature point combinations;

calculating, by the computing device, transformation errors of the feature point combinations using the homography transformation matrix to obtain an error calculation result; and performing, by the computing device, live human face verification of the face images according to the error calculation result.

16. The non-transitory computer readable storage medium according to claim 15, wherein the face images are captured simultaneously by the at least two cameras.

17. The non-transitory computer readable storage medium according to claim 15, wherein the acquiring the face images captured by at least two cameras comprises:

acquiring image data captured by at least two cameras;

performing face detection on the image data to obtain a face detection result; and when the face detection result indicates that face images are detected, acquiring the face images.

* * * * *